United States Patent
Carlen et al.

(10) Patent No.: US 9,618,950 B2
(45) Date of Patent: Apr. 11, 2017

(54) VOLTAGE CONTROL SYSTEM

(71) Applicant: ABB Technology AG, Zurich (CH)

(72) Inventors: Martin Carlen, Niederrohrdorf (CH); Irma Buschmann, Brilon (DE); Frank Cornelius, Brilon (DE); Jens Tepper, Brilon (DE); Benjamin Weber, Winterberg (DE); Yong Wang, Brilon (DE)

(73) Assignee: ABB SCHWEIZ AG, Baden (CH)

( * ) Notice: Subject to any disclaimer, the term of this patent is extended or adjusted under 35 U.S.C. 154(b) by 31 days.

(21) Appl. No.: 14/854,110

(22) Filed: Sep. 15, 2015

(65) Prior Publication Data

US 2016/0077534 A1 Mar. 17, 2016

(30) Foreign Application Priority Data

Sep. 16, 2014 (EP) .................................. 14003215

(51) Int. Cl.
*G05F 1/14* (2006.01)
*H01F 29/04* (2006.01)
*H02J 3/18* (2006.01)

(52) U.S. Cl.
CPC ............... *G05F 1/14* (2013.01); *H01F 29/04* (2013.01); *H02J 3/1878* (2013.01); *Y02E 40/30* (2013.01)

(58) Field of Classification Search
CPC ... G05F 1/20; G05F 1/253; G05F 1/30; G05F 1/14; H02M 5/10; H01F 29/00; H01F 29/04
USPC ................. 323/207, 258, 262, 263, 299, 340
See application file for complete search history.

(56) References Cited

U.S. PATENT DOCUMENTS

| | | | | |
|---|---|---|---|---|
| 2,199,658 A | * | 5/1940 | Chase | H02H 3/28 361/64 |
| 5,905,491 A | * | 5/1999 | Kim | H02M 1/4225 345/212 |
| 6,137,277 A | * | 10/2000 | Rajda | G05F 1/20 323/258 |
| 2004/0057258 A1 | * | 3/2004 | Dobrowolski | H02M 7/106 363/59 |
| 2004/0145929 A1 | * | 7/2004 | Mihara | H02M 1/425 363/98 |

FOREIGN PATENT DOCUMENTS

| | | |
|---|---|---|
| EP | 2219277 A1 | 8/2010 |
| JP | 2014115770 A | 6/2014 |

* cited by examiner

*Primary Examiner* — Adolf Berhane
(74) *Attorney, Agent, or Firm* — Leydig, Voit & Mayer, Ltd.

(57) ABSTRACT

According to an embodiment, the invention provides a voltage control system for medium voltage applications. The voltage control system provides a booster-transformer and a feeder-transformer, each of the booster-transformer and the feeder-transformer having a respective primary winding and a secondary winding, wherein the secondary winding of the feeder-transformer is electrically connected with the primary winding of the booster-transformer by an intermediate circuit. The voltage control system also includes a connection device configured to connect the secondary winding of the booster transformer with an electrical energy supply network in order that the secondary winding of the booster transformer is connected in series with a transmission line having a voltage that is to be controlled.

15 Claims, 2 Drawing Sheets

VOLTAGE CONTROL SYSTEM

CROSS REFERENCE TO RELATED APPLICATIONS

This application claims benefit to European Patent Application Serial No. 14 003 215.2, filed Sep. 16, 2014.

FIELD

The invention relates to voltage control systems for medium voltage applications, and in particular, to voltage control systems for medium voltage applications for regulating the voltage within a distribution network for electrical energy.

BACKGROUND

Voltage levels in distribution networks for electrical energy depends on several factors, such as the location within the distribution network, e.g., a certain location along the extension of a distribution or transmission line, or the actual load condition. The voltage level is subject to continuous variation therein.

Medium voltage, in the context of this application, refers to a typical voltage level of a distribution network between roughly 50V and 36 kV. In order to keep the voltage level for the loads of a distribution network within a desired range around the nominal voltage of a respective part of the distribution network, e.g. a nominal voltage level of 10 kV, it is known to provide tap changers for the distribution transformers of the distribution network.

Tap changers have the ability to adapt the voltage ratio of a transformer, for example with a rated voltage of 36 kV on the primary side and 6 kV on the secondary side and with a rated power of 1 MVA, within a certain range, so that the voltage on the output side of the transformer is within a desired range around the nominal voltage. Tap changing of transformers requires a high effort for construction since additional taps for the transformer winding have to be foreseen as well as an additional tap changer which is a selector switch between the different taps. Due to the high current which might have to be switched by the tap changer during load condition tap changers are subject to an increased wear.

It is also known that, especially for long transmission lines, e.g. with lengths of 10 km or more, a continuous voltage drop or even a voltage rise along the transmission line might occur dependent on the actual load conditions. In this case it might not be possible to provide a voltage level for each location along the whole length of a transmission line that is within an admitted tolerance level around the nominal voltage. At one end of the transmission line the voltage level might be below the admitted tolerance range even on the other end the voltage level is at the upper edge of the admitted tolerance range.

SUMMARY

According to an embodiment, the invention provides a voltage control system for medium voltage applications. The voltage control system provides a booster-transformer and a feeder-transformer, each of the booster-transformer and the feeder-transformer having a respective primary winding and a secondary winding, wherein the secondary winding of the feeder-transformer is electrically connected with the primary winding of the booster-transformer by an intermediate circuit, wherein at least one of the transformer windings in the intermediate circuit comprises at least two taps, from which one can be selected as an active tap, and wherein electrically adjacent taps are assigned to different groups, one or more contactor switches which are associated with each of the taps which are selectively switchable into the intermediate circuit, wherein not more than one contactor switch of a group is switchable at the same time, one or more commutation resistors connected in series with the taps of each group, and a connector configured to connect the secondary winding of the booster transformer with an electrical energy supply network such that the secondary winding of the booster transformer is connected in series with a transmission line having a voltage that is to be controlled.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
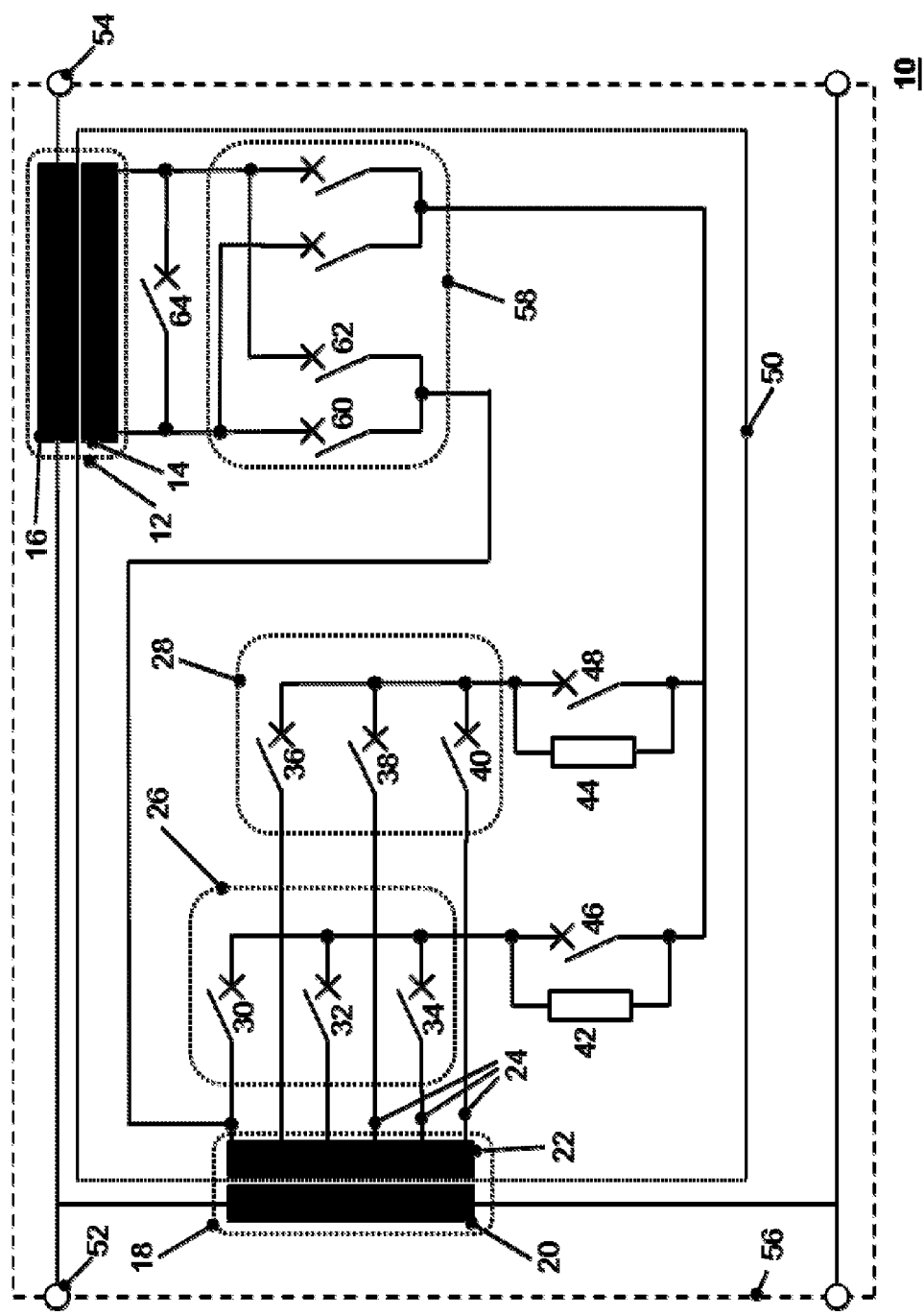
FIG. 1 shows a first exemplary voltage control system according to an embodiment of the invention.

An embodiment of the invention provides a control system for medium voltage applications for regulating the voltage within a distribution network for electrical energy, which is on one side flexible for integration within the distribution network and which is on the other side robust and not subject to an increased wear.

An embodiment of the invention includes the following components: a booster-transformer and a feeder-transformer with respective primary and secondary windings, wherein the secondary winding of the feeder transformer is electrically connected with the primary winding of the booster transformer in an intermediate circuit, wherein at least one of the transformer windings in the intermediate circuit comprises at least two taps, wherefrom one is selectable as an active tap, wherein electrically adjacent taps are assigned to different groups, respective contactor switches which are associated to each of the taps which are selectively switchable into the intermediate circuit therewith, wherein not more than one contactor switch of a group is switchable at the same time, respective commutation resistors in electrical series connection with the taps of each group, a common cabinet wherein the aforementioned components are arranged in and connection means in order to connect the secondary winding of the booster transformer with an electrical energy supply network in that way, that the secondary winding of the booster transformer is in series with a distribution line that's voltage is to be controlled.

An embodiment of the invention provides a compact voltage regulation unit, which is easy to integrate in a distribution network as well in close proximity of a transformer as in a larger distance of a distribution substation. The combination of feeder transformer and booster transformer enables the use of the voltage control system independent of any distribution transformer of the distribution network.

The primary winding of the feeder transformer can be connected to the input of the distribution line or any another electrical component that's voltage is foreseen to be controlled. The secondary winding of the booster transformer is electrically in series with the distribution line or the any other electrical component that's voltage is foreseen to be controlled. Thus by adding a respective voltage to the input voltage by use of the booster transformer a voltage control is enabled. The effect of the booster transformer is adjustable by selecting a respective suitable tap of the feeder transformer winding within the intermediate circuit.

An embodiment of the invention uses contactor switches instead of a conventional tap changer for switching between the different taps of the feeder- respectively booster-transformer. Contactor switches are well known switching elements for single or three phase connection which are suitable to switch currents in the range of 100 A and significantly above. The use of several contactor switches instead of one tap-changer enables a simplified construction since contactor switches are very common and reliable components which are produced in an enormous quantity. In case of a defect of a single contactor switch it can be exchanged selectively and easily wherein a defect tap-changer would have to be exchanged completely. Preferably all contactor switches are identical.

The wording "switchable at the same time" means that not more of on contactor switch of each group can be switched on at the same time. If no contactor switch of a group is in the closed state, it is possible to close a contactor switch of this group. If already any contactor switch of a group is closed, it is not possible to close a further contactor switch of the same group. Electrically adjacent taps are assigned to different groups of taps. Thus a tap change from the active tap to a higher or lower tap is associated with a tap change from one group to the other group. In order to avoid any short-circuit inbetween taps of the same group it is foreseen, that not more than one contactor switch of one group is switchable respectively is in the closed state at the same time. This can be realized for example by a respective control algorithm in an associated control device for the contactor switches which is foreseen to coordinate the triggering of the contractors in a correct sequence.

Each of the groups of taps respectively each of the groups of associated contactor switches is connected with a preferably common commutation resistor. Thus it is possible to switch on one respective contactor switch of each group at the same time since a respective short circuit current is limited by the commutation resistors. Due to the limited thermal capacity of the commutation resistors this time is limited for example to a few 100 ms, but this enables an interruption free change of the taps in an advantageous way.

Thus according to a further embodiment of the invention two contactor switches associated to electrically adjacent taps are switchable at the same time during a tap-change, so that an interruption-free change of the active tap is enabled.

The arrangement in a preferably standardized common cabinet enables a high flexibility of such a system. A common cabinet might be made from iron sheets or the like but it can also be made from concrete. In case of a weak area within a distribution network, where the voltage level does not meet the requirements, a voltage control system can easily be integrated.

According to a further embodiment of the invention the intermediate circuit comprises a contactor switch-based switchable cross connection for reversing the polarity of voltage. Preferably those contactor switches are identical to the other contactor switches. Thus it is possible to add the voltage of secondary winding of the booster transformer with reversed polarity in an advantageous way if required.

According to a further embodiment of the invention at least one further contactor switch is foreseen for shortening an associated commutation resistor. Thus after completing a process of a tap change whilst that two contactor switches are switched on at the same time there is no further need for limiting a short circuit current. In order to minimize the losses in that case where only one contactor switch is switched on, the respective commutation resistor can be shortened or bridged with the further contactor switch.

According to a further embodiment of the invention the system is adapted for a three phase network. Distribution networks for electrical energy are typically three-phase networks, thus also a voltage control system has to be suitable therefore. The system with booster- and feeder-transformers respectively intermediate circuits has to be foreseen three times therefore, wherein all components are preferably arranged within the same cabinet. Booster- and feeder transformers are preferably realized by a respective three-phase transformer.

According to a further embodiment of the three-phase voltage control system booster- and feeder-transformer windings are arranged on the same transformer core, which has one inner and two outer legs. Both transformer types have preferably approximately the same power rates, thus it is possible to arrange their windings on the medium leg of a common three-leg transformer core in that way, that the respective magnetic flux caused by the windings are contrariwise. By this the cross section of the medium leg of the transformer core can be reduced in an advantageous way.

According to another embodiment of the invention the system further comprises a control device for triggering the contactor switches in a respective predefined sequence in case of a desired tap change. Since each contactor switch is theoretically switchable individually, a control mechanism has to be foreseen, which excludes a switching of the contactor switches in that way, that an unallowable state arises. A suitable control device is for example a computing device with a respective control program running thereon.

Typical rules for switching are for example: not more than one contactor switch of each group switched on at the same time, switching of the cross connection for reversing the polarity of voltage is only possible if the lowest tap is active so that no current is flowing through the intermediate circuit during reversing the polarity, switching on of two contactor switches of different groups at the same time is only possible in that case, that at least one commutation resistor is not shortened.

According to a further embodiment of the invention the control device comprises a user interface for manual interaction. Such a user interface enables parameterization of the voltage control system, for example the definition of delay times for switching, minimum time between several tap changes, parameterization of a PLC interface and so on.

According to another embodiment of the invention the control device comprises a display unit for providing operational information of the system. Thus it is possible, during maintenance for example, to easily present information about the current status of the system or to display for example historic system data about an earlier time period. Of course such a display is also suitable as part of a user interface.

According to a further embodiment of the invention the voltage control system comprises a remote terminal unit (RTU). A remote terminal unit is a suitable device to integrate the voltage control system into a super-coordinated control system and enables access to the control device for example from a remote control room.

According to certain embodiments of the invention a bypass mode is automatically activated in case of an automatic detected criterion such as the temperature within the cabinet exceeds a certain level or another not admitted operational status is rising. Thus a thermal overload of the voltage control system for example due to hot environmental frame conditions is excluded. Further criteria for activating the bypass are for example a fault of a component, the breakdown of the control system, a power outage on a distribution line that's voltage is to be controlled, the breakdown or malfunction of sensors, an asymmetric system or a deviation of desired to real state.

According to another embodiment of the invention the following operation modes are foreseen: automatic mode, manual mode, bypass mode.

Especially distribution networks of lower voltage levels such as 380V are not necessarily integrated into a superordinated control system. Thus the different modes enable an easy manual adaptation of the operational behavior of the voltage control system by an operator which is occasionally on site.

Automatic mode means that a certain voltage level is given as desired voltage and the voltage control system is repeatedly selecting one of the respective taps as active tap respectively is controlling the switchable cross connection in that way, that the desired voltage level is reached within a certain band of tolerance. Manual mode means that a fixed status of the active tap respectively the switchable cross connection is steadily selected. Bypass mode means the deactivation of the whole control system so that no voltage is added by the secondary winding of the booster transformer.

According to a further variant of the voltage control system the cabinet is foreseen with doors on its front-side in order to give accessibility for maintenance wherein the transformers are arranged on the rear-side. The arrangement of larger components such as transformers at the rear side increases accessibility in an advantageous way.

FIG. 1 shows a first exemplary voltage control system 10 in an electrical sketch. Main components of the voltage control system 10 are a booster transformer 12 with primary winding 14 and secondary winding 16, which have a transmission rate of 1:1 in this example, and a feeder transformer 18 with primary winding 20 and secondary winding 22.

The secondary winding 16 of the booster transformer 12 is electrically connected with first 52 and second 54 connection means so it can be connected easily electrically in series with a transmission line or any other component, that's voltage is foreseen to be controlled by adding a control voltage which is induced in the secondary winding 16.

The primary winding 20 of the feeder transformer 18 is foreseen to be electrically connected inbetween the input voltage at the first connection means 52 and a neutral conductor which can be set on earth potential to approximately 0V. Further connection means are foreseen for electrically connecting a respective neutral conductor with the voltage control system 10.

The secondary winding 22 of the feeder transformer 18 and the primary winding 12 of the booster transformer 12 are electrically connected into an intermediate circuit 50, wherein the feeder transformer 18 is driving a current through the intermediate circuit 50 which induces an additional control voltage in the secondary winding 16 of the booster transformer 12. Thus the current flow through the intermediate circuit 50 determines the additional control voltage which is added by the secondary winding 16 of the booster transformer.

In order to influence the current flow through the intermediate circuit 50 the secondary winding 22 of the feeder transformer 18 comprises several taps 24, for example at 0%, 20%, 40%, 60%, 80% and 100%. Dependent on which of the taps 24 is set as active tap the current through the intermediate circuit 50 will be higher or lower. In case of a tap at 0% no current will flow and no additional control voltage will be induced therewith.

A respective contactor switch 30, 32, 34, 36, 38, 40 is associated to each of the taps 24, wherein electrically adjacent taps are assigned to different groups. Thus a first group of contactor switches 30, 32, 34 and a second group of contactor switches 36, 38, 40 is build. The use of contactor switches instead of a tap changer enables a simplified and more reliable possibility for selecting the active tap 24. A respective commutation resistor 42, 44 is electrically in series with the first group of contactor switches 30, 32, 34 respectively with the second group of contactor switches 36, 38, 40. Each of the commutation resistors can be bridged with a respective contactor switch 46, 48, which are preferably identical to the other contactor switches 30, 32, 34, 36, 38, 40.

Furthermore a cross connection 58 for reversing polarity of voltage within the intermediate circuit 50 is foreseen so that also the polarity of the additional control voltage at the secondary winding 16 of the booster transformer 12 can be reversed therewith. Also the cross connection 58 is based on contactor switches 60, 62 so that a high degree of equality of the components is gained. Another contactor switch 64 is foreseen for shortening the primary winding 14 of the booster transformer 12 so that it is ensured in any case, that no additional control voltage is induced if this is required.

All components are arranged within a common cabinet 56 wherein the required connection means 52, 54 for electrically integrating the voltage control system 10 into a distribution network are foreseen at the outside of the control cabinet 56 in this case. Thus an easy handling of the voltage control system is enabled. In case of rough environmental conditions for outdoor operation of the voltage control system the control cabinet might be made of concrete or arranged within a small protection building.

Typical frame parameters for such a voltage control system 10 are for example a nominal voltage of 0.4 kV 3 phase, maximum current of 400 A, a control range of +/−6% of the rated voltage of the transmission line that's voltage is foreseen to be controlled, 6 taps and a rated power of 250 kVA. Of course the embodiments are not limited to those frame parameters also a large variation around those parameters is possible.

Figure 2:
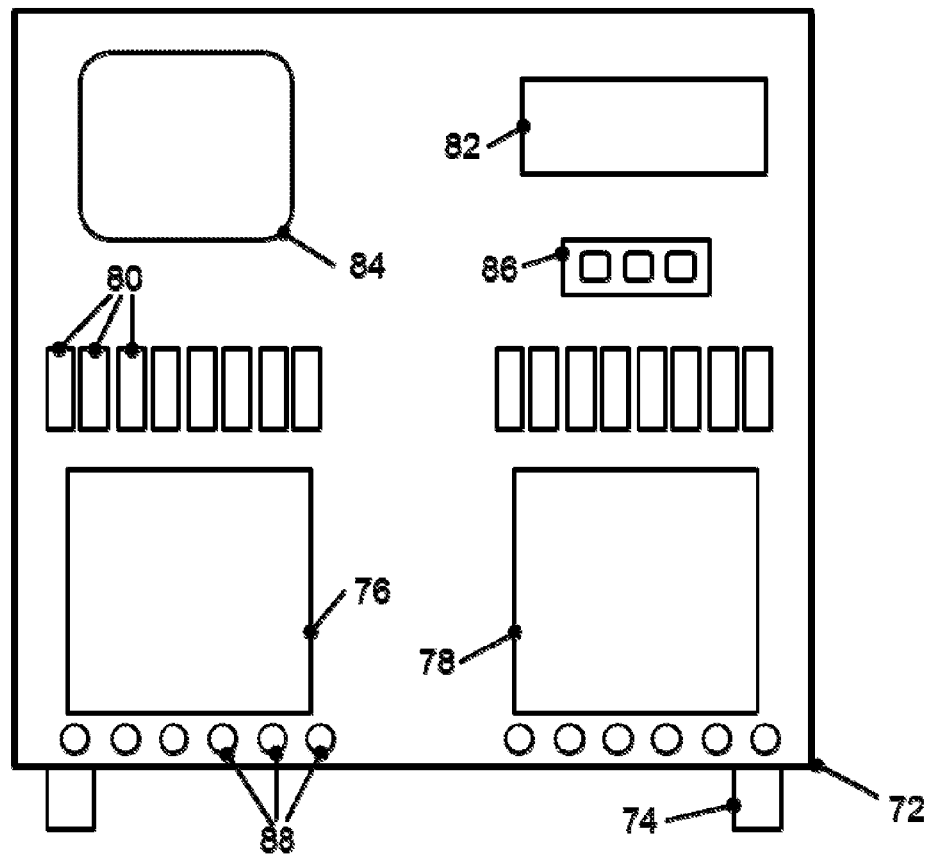
FIG. 2 shows a second exemplary voltage control system according to an embodiment of the invention.

FIG. 2 shows a second exemplary voltage control system 70 in a principal sketch of the arrangement of the respective components. A common cabinet 72 with pedestals 74 has a height of approximately 2m and comprises a booster transformer 76 respectively a feeder transformer 78 at its bottom. In the upper area a control device 82, for example calculation unit such as a personal computer, and display unit 84 are foreseen. Several identical contactor switches 80 are arranged in a geometrical row in the medium area of the control cabinet 70. A mode selector switch 86 provides the possibility, to manually select between several operation modes, for example "automatic", "manual" or "bypass".

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 first exemplary voltage control system
12 booster transformer
14 primary winding of booster transformer
16 secondary winding of booster transformer
18 feeder transformer
20 primary winding of feeder transformer
22 secondary winding of feeder transformer
24 taps of feeder transformer
26 first group of taps
28 second group of taps
30 contactor switch associated to first tap
32 contactor switch associated to third tap
34 contactor switch associated to fifth tap
36 contactor switch associated to second tap
38 contactor switch associated to fourth tap
40 contactor switch associated to sixth tap
42 commutation resistor of first group of taps
44 commutation resistor of second group of taps
46 contactor switch associated to commutation resistor of first group of taps
48 contactor switch associated to commutation resistor of second group of taps
50 intermediate circuit
52 first connection means
54 second connection means
56 common cabinet
58 cross connection for reversing polarity of voltage
60 first contactor switch of cross connection
62 second contactor switch of cross connection
64 contactor switch associated to primary winding of booster
70 second exemplary voltage control system
72 common cabinet
74 pedestal of common cabinet
76 booster transformer
78 feeder transformer
80 contactor switches
82 control device
84 display unit
86 mode selector switch
88 connection means

The invention claimed is:

1. A voltage control system for medium voltage applications, comprising:
a booster-transformer and a feeder-transformer, each of the booster-transformer and the feeder-transformer having a respective primary winding and a secondary winding, wherein the secondary winding of the feeder-transformer is electrically connected with the primary winding of the booster-transformer by an intermediate circuit, wherein at least one of the transformer windings in the intermediate circuit comprises at least two taps, from which one can be selected as an active tap, and wherein electrically adjacent taps are assigned to different groups;
one or more contactor switches which are associated with each of the taps which are selectively switchable into the intermediate circuit, wherein not more than one contactor switch of a group is switchable at the same time;
one or more commutation resistors connected in series with the taps of each group; and
a connector configured to connect the secondary winding of the booster transformer with an electrical energy supply network such that the secondary winding of the booster transformer is connected in series with a transmission line having a voltage that is to be controlled.

2. The voltage control system according to claim 1, wherein contactor switches associated to electrically adjacent taps are switchable at the same time during a tap-change so as to enable an interruption-free change of the active tap.

3. The voltage control system according to claim 1, wherein the intermediate circuit comprises a contactor switch-based switchable cross connection for reversing the polarity of voltage.

4. The voltage control system according to claim 1, wherein at least one further contactor switch is foreseen for shortening an associated commutation resistor.

5. The voltage control system according to claim 1, wherein the system is adapted for a three phase network.

6. The voltage control system according to claim 5, wherein the primary windings and the secondary windings of both of the booster-transformer and the feeder-transformer are built three-phase and arranged on the same transformer core.

7. The voltage control system according to claim 1, further comprising a control device configured to trigger the contactor switches in a respective predefined sequence in case of a desired tap change.

8. The voltage control system according to claim 7, wherein the control device comprises a user interface for manual interaction.

9. The voltage control system according to claim 8, wherein the control device further comprises a display unit for providing operational information of the system.

10. The voltage control system according to claim 1, further comprising a remote terminal unit (RTU).

11. The voltage control system according to claim 1, wherein a bypass mode is automatically activated when an automatically detected criterion is met.

12. The voltage control system according to claim 1, wherein the following operation modes are provided: automatic mode, manual mode, and bypass mode.

13. The voltage control system of claim 1, further comprising a common cabinet, in which the booster-transform, the feeder-transformer, the one or more contactor switches, and the one or more commutation resistors are arranged.

14. The voltage control system of claim 13, wherein the common cabinet comprises doors on a front-side in order to provide accessibility for maintenance, and wherein the booster-transform and the feeder-transformer are arranged on a rear-side of the common cabinet.

15. The voltage control system according to claim 11, wherein the automatically detected criterion is a temperature within the common cabinet exceeding a threshold.

* * * * *